(12) United States Patent
Kaneko et al.

(10) Patent No.: US 11,124,075 B2
(45) Date of Patent: Sep. 21, 2021

(54) ELECTRICALLY DRIVEN WORK VEHICLE, AND WHEEL ELECTRIC DRIVING UNIT

(71) Applicant: HITACHI CONSTRUCTION MACHINERY CO., LTD., Tokyo (JP)

(72) Inventors: Satoru Kaneko, Tokyo (JP); Shinji Sugimoto, Tokyo (JP); Takayoshi Nakamura, Tokyo (JP); Tadashi Osaka, Tokyo (JP); Masatsugu Arai, Tsuchiura (JP); Naoki Fukuda, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 72 days.

(21) Appl. No.: 16/631,891

(22) PCT Filed: Jun. 19, 2018

(86) PCT No.: PCT/JP2018/023236
§ 371 (c)(1),
(2) Date: Jan. 17, 2020

(87) PCT Pub. No.: WO2019/064733
PCT Pub. Date: Apr. 4, 2019

(65) Prior Publication Data
US 2020/0156483 A1 May 21, 2020

(30) Foreign Application Priority Data
Sep. 29, 2017 (JP) .............................. JP2017-190583

(51) Int. Cl.
*B60K 6/24* (2007.10)
*B60K 6/26* (2007.10)
(Continued)

(52) U.S. Cl.
CPC ................. *B60L 50/10* (2019.02); *B60K 6/24* (2013.01); *B60K 6/26* (2013.01); *B60K 6/46* (2013.01);
(Continued)

(58) Field of Classification Search
CPC ........... B60L 50/10; B60L 53/20; B60K 6/24; B60K 6/26; B60K 6/46; B60K 7/0007;
(Continued)

(56) References Cited

U.S. PATENT DOCUMENTS 7,443,122 B2 * 10/2008 Tate .................... B60L 15/10
318/434
7,615,948 B2 * 11/2009 Atarashi .................. H02P 5/74
318/400.09
(Continued)

FOREIGN PATENT DOCUMENTS

JP  2006-062571 A   3/2006
JP  2006-345677 A   12/2006
(Continued)

OTHER PUBLICATIONS

International Preliminary Report on Patentability received in corresponding International Application No. PCT/JP2018/023236 dated Apr. 9, 2020.
(Continued)

*Primary Examiner* — John D Walters
(74) *Attorney, Agent, or Firm* — Mattingly & Malur, PC

(57) ABSTRACT

A dump truck 100 including: an engine 1; a generator 10 driven by the engine 1; and a pair of driving wheels 3L and 3R arranged to the left and right of a vehicle body frame 7 includes: a traveling electric motor 12L including a plurality of electric motors 12La, 12Lb, and 12Lc that are coupled to the driving wheel 3L and simultaneously drive the driving wheel 3L; and a traveling electric motor 12R including a
(Continued)

plurality of electric motors 12Ra, 12Rb, and 12Rc that are coupled to the driving wheel 3R and simultaneously drive the driving wheel 3R. Thereby, drive systems corresponding to loads of dump trucks or the like can be configured using identical components.

4 Claims, 7 Drawing Sheets

(51) Int. Cl.
    *B60K 7/00*     (2006.01)
    *B60L 50/10*     (2019.01)
    *B60L 53/20*     (2019.01)
    *B60K 6/46*     (2007.10)

(52) U.S. Cl.
    CPC ............ *B60K 7/0007* (2013.01); *B60L 53/20* (2019.02); *B60K 2006/266* (2013.01); *B60K 2007/003* (2013.01); *B60K 2007/0092* (2013.01)

(58) Field of Classification Search
    CPC ........ B60K 2006/266; B60K 2007/003; B60K 2007/0092
    See application file for complete search history.

(56) References Cited

U.S. PATENT DOCUMENTS

| 9,018,878 | B2 | 4/2015 | Hendrickson et al. |
| 2014/0163804 | A1* | 6/2014 | Kaneko ................. B60W 10/08 701/22 |

FOREIGN PATENT DOCUMENTS

| JP | 2012-257347 A | 12/2012 |
| JP | 2015-037375 A | 2/2015 |
| JP | 2015-101193 A | 6/2015 |
| JP | 2015-196494 A | 11/2015 |
| JP | 2015-231777 A | 12/2015 |

OTHER PUBLICATIONS

International Search Report of PCT/JP2018/023236 dated Jul. 24, 2018.

Extended European Search Report received in corresponding European Application No. 18863400.0 dated Feb. 25, 2021.

* cited by examiner

ELECTRICALLY DRIVEN WORK VEHICLE, AND WHEEL ELECTRIC DRIVING UNIT

TECHNICAL FIELD

The present invention relates to an electrically driven work vehicle, and a wheel electric driving unit.

BACKGROUND ART

A large number of large-sized dump trucks for carrying ores and stripped soil from a loading site to a soil-dropping site are operating at mines. There is a predetermined route from a loading site to a soil-dropping site, and an attempt for enhancement of the transportation efficiency is made by making a plurality of dump trucks of the same vehicle class operate up to a maximum of 24 hours per day, and travel to make round trips in one route.

In this manner, importance is placed on the transportation efficiency represented by workloads (energy amount) per unit cost (initial cost+running cost) if a plurality of large-sized dump trucks are caused to operate for a long time. Various types of measure for realizing initial cost reduction and running cost reduction are taken about the dump trucks in order to enhance the transportation efficiency. Among them, the running cost reduction can be realized by reducing fuel consumption by using an electric driving system which is one type of driving system that is efficient and requires relatively low maintenance cost.

While motive power of an engine is transmitted to tires by using a torque converter and a transmission in a mechanical driving system of a dump truck, a generator is driven by using an engine, and electric power generated in the generator is used to drive a traveling electric motor coupled to a tire shaft in an electric driving system in an electric driving system. As a technology to drive a vehicle by using an electric motor coupled to a tire shaft in this manner, for example, Patent Document 1 discloses a vehicle drive system having: first and second electric motors that are arranged next to each other; a liquid medium supply apparatus that is arranged, in the direction in which the first and second electric motors are arranged next to each other between one end which is an end portion of the first electric motor opposite the second electric motor, and the other end which is an end portion of the second electric motor opposite the first electric motor and supplies a liquid medium to each to-be-cooled/lubricated portion which is at least one of a to-be-cooled portion and a to-be-lubricated portion of each of the first and second electric motors; a first cooling-lubricating path for supplying the liquid medium from the liquid medium supply apparatus to a to-be-cooled/lubricated portion of the first electric motor, the first cooling-lubricating path passing through a location on an outer side relative to the one end of the first electric motor; and a second cooling-lubricating path for supplying the liquid medium from the liquid medium supply apparatus to a to-be-cooled/lubricated portion of the second electric motor, the second cooling-lubricating path passing through a location on an outer side relative to the other end of the second electric motor.

PRIOR ART DOCUMENT

Patent Document

Patent Document 1: JP-2012-257347-A

SUMMARY OF THE INVENTION

Problem to be Solved by the Invention

Incidentally, as dump trucks intended for uses at mines, vehicles having beds with various sizes are selected such as those in the classes of load of 100-ton to 300-ton, for example, depending on situations of work sites or the sizes of shovels for performing loading. That is, several series of dump trucks with different loads needs to be made ready as dump trucks intended for uses at mines. Accordingly, traveling electric motors with various capacities also need to be prepared as components of the driving systems.

That is, since if it is tried to apply the conventional technique explained above to a dump truck intended for uses at mines, the necessity arises for preparation of a pair of electric motors mounted for left and right rear wheels with different capacities for vehicles with different loads, there has been room for improvement in terms of initial cost reduction.

The present invention is made in view of the matters explained above, and an object thereof is to provide an electrically driven work vehicle and a wheel electric driving unit that enable configuration of drive systems corresponding to loads of dump trucks or the like by using identical components.

Means for Solving the Problem

The present application includes a plurality of means for solving the problems explained above, and if one example of them is to be mentioned, it is an electrically driven work vehicle including an engine, a generator driven by the engine, and a pair of wheels including a first wheel and a second wheel arranged to a left and a right of a vehicle body frame, the electrically driven work vehicle including: a first electric motor group including a plurality of electric motors that are coupled to the first wheel and simultaneously drive the first wheel; a second electric motor group including a plurality of electric motors that are coupled to the second wheel and simultaneously drive the second wheel; a first inverter that drives the plurality of electric motors in the first electric motor group; and a second inverter that drives the plurality of electric motors in the second electric motor group, in which the pluralities of electric motors in the first and second electric motor groups have the same rated output power, the plurality of electric motors in the first electric motor group are connected to the first inverter in parallel, and the plurality of electric motors in the second electric motor group are connected to the second inverter in parallel, and the first and second inverters are connected in series to each other such that voltages obtained by halving a DC bus voltage that is an output voltage of the generator are applied to the first and second inverters, respectively.

Advantage of the Invention

According to the present invention, drive systems corresponding to loads of dump trucks or the like can be configured using identical components.

MODES FOR CARRYING OUT THE INVENTION

Hereinafter, embodiments of the present invention are explained with reference to the drawings. Note that although, in the present embodiment explained, a dump truck having a bed on which objects to be loaded are loaded is illustrated as an exemplary electrically driven work vehicle, the present invention can be applied to any vehicle other than dump trucks as long as the vehicle is an electrically driven work vehicle having wheels.

First Embodiment

A first embodiment of the present invention is explained with reference to FIG. 1 to FIG. 7.

Figure 1:
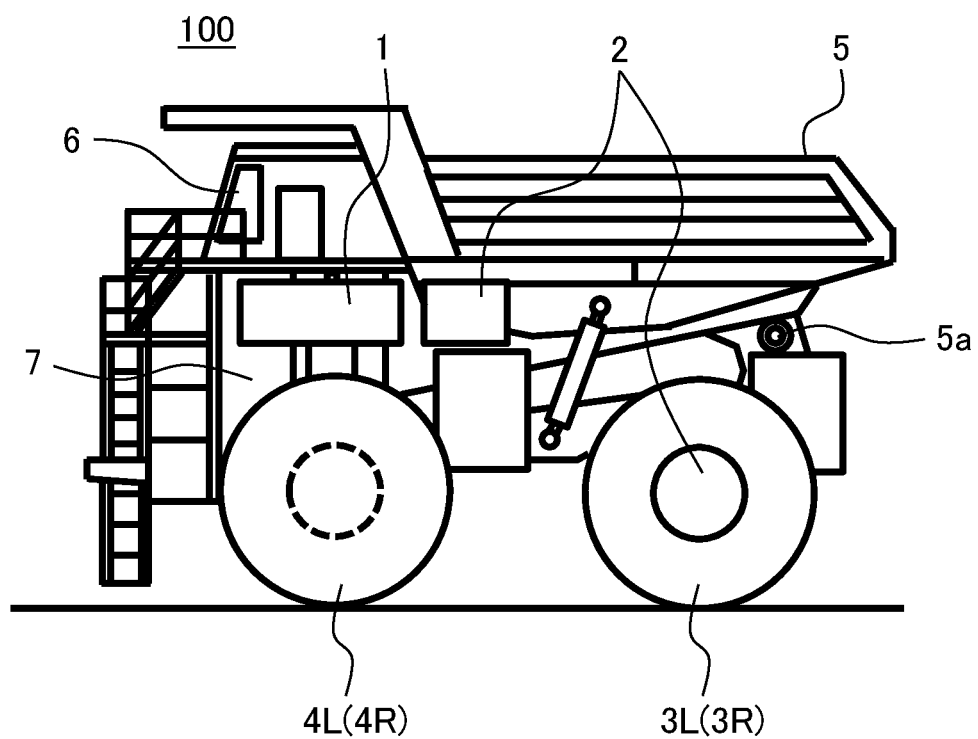
FIG. 1 is a side view schematically illustrating the external appearance of a dump truck which is an exemplary electrically driven work vehicle according to a first embodiment.

FIG. 1 is a side view schematically illustrating the external appearance of a dump truck which is an exemplary electrically driven work vehicle according to the present embodiment.

In FIG. 1, a dump truck 100 is generally constituted by: a vehicle body frame 7 that extends forward/backward, and forms a support structure; a bed (vessel) 5 that is arranged at an upper portion of the vehicle body frame 7, and to calculate forward/backward, and is provided at its lower end portion to the vehicle body frame 7 via a pin-joining portion 5a such that the bed 5 can be tipped; a pair of follower wheels 4L (4R) provided at lower front left and right portions of the vehicle body frame 7; a pair of driving wheels 3L (3R) provided at lower rear left and right portions of the body; an operator's seat 6 provided at an upper front portion of the vehicle body frame 7; an engine 1 arranged on the vehicle body frame 7; and an electric driving system 2 having traveling electric motors 12L and 12R that drive wheels (the driving wheels 3L and 3R) by using electric power output from a generator 10 (see FIG. 2 mentioned below) driven by the engine 1, and the like. Note that, in FIG. 1, only one of the configurations of a pair of the left and right follower wheels and driving wheels is illustrated and given a sign, the other of them is indicated only by a sign in parentheses in the figure, and an illustration thereof is omitted.

Figure 2:
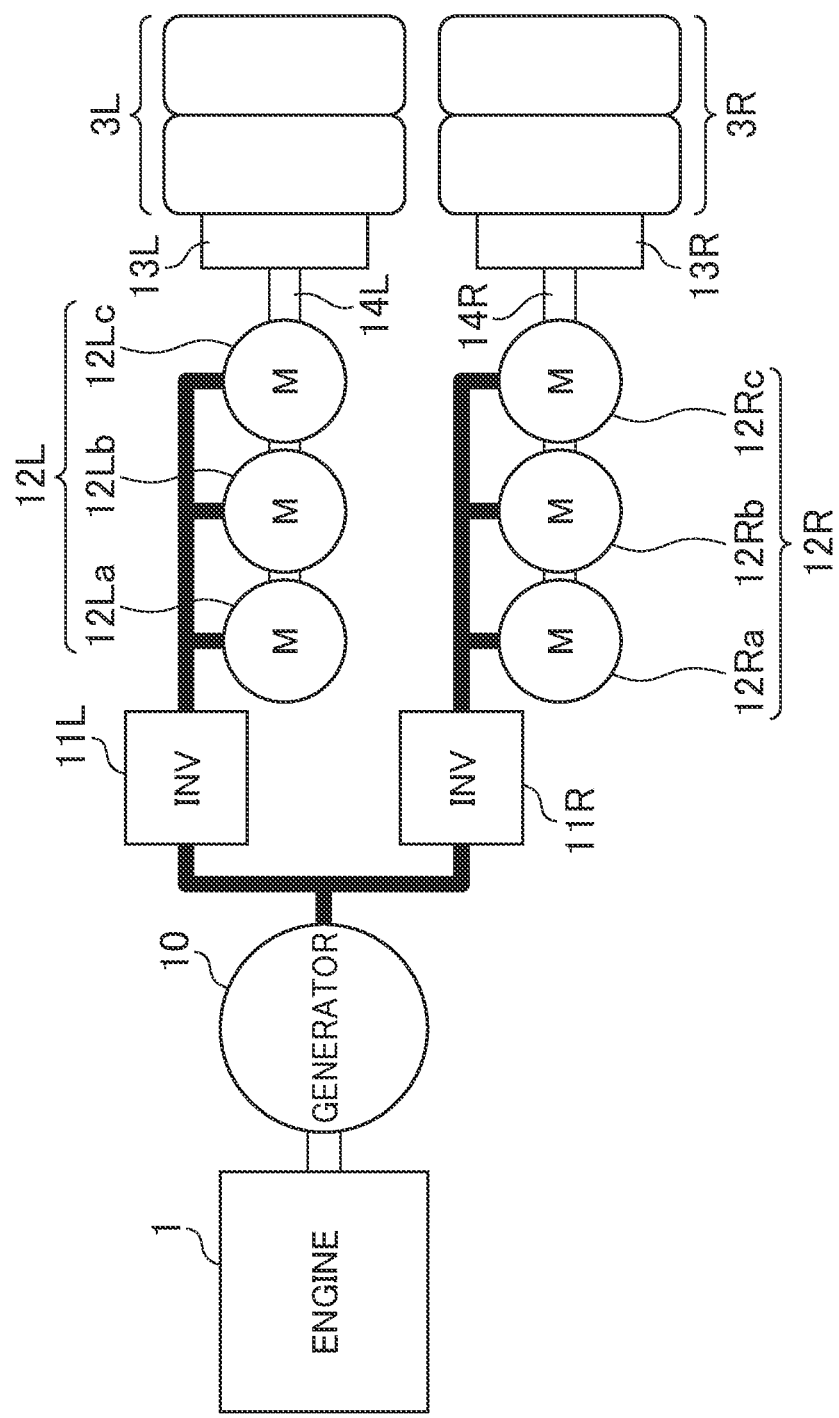
FIG. 2 is a figure schematically illustrating an extracted part of an electric driving system along with peripheral configurations.

FIG. 2 is a figure schematically illustrating an extracted part of the electric driving system along with peripheral configurations.

In FIG. 2, the electric driving system 2 has: the generator 10 driven by the engine 1; the traveling electric motors 12L and 12R that drive the driving wheels 3L and 3R (wheels) by using electric power output from the generator 10; and inverters 11L and 11R that convert direct current power supplied from the generator 10 into alternating current power drive signals, and supply the alternating current power drive signals to the traveling electric motors 12L and 12R. The driving wheels 3L and 3R are individually connected with output shafts 14L and 14R of the traveling electric motors 12L and 12R via speed reducers 13L and 13R, respectively, and drive the driving wheels 3L and 3R by using the traveling electric motors 12L and 12R, respectively. That is, the electric driving system 2 allows the dump truck 100 to travel by: converting rotational energy of the output shafts of the engine 1 into electrical energy at the generator 10; supplying the inverters 11L and 11R with the electrical energy as direct current power by using the AC/DC conversion function (not illustrated) of the generator 10; converting the direct current power into alternating current power having a controlled frequency and a controlled voltage at the inverters 11L and 11R; supplying the alternating current power to the traveling electric motors 12L and 12R; and rotationally driving the driving wheels 3L and 3R by using the traveling electric motors 12L and 12R.

The traveling electric motor 12L is constituted by a plurality of (e.g., three) electric motors 12La, 12Lb, and 12Lc (e.g., induction motors) that are coupled to simultaneously drive the driving wheel 3L arranged to the left of the vehicle body frame 7. Similarly, the traveling electric motor 12R is constituted by a plurality of (e.g., a set of three) electric motors 12Ra, 12Rb, and 12Rc (e.g., induction motors) that are coupled to simultaneously drive the driving wheel 3R arranged to the right of the dump truck. The traveling electric motors 12L and 12R can each be said to be an electric motor group constituted by a plurality of electric motors.

As the plurality of electric motors 12La, 12Lb, 12Lc, 12Ra, 12Rb, and 12Rc constituting the traveling electric motors 12L and 12R, electric motors of the same capacity (e.g., electric motors having the same rated output power) are used.

Figure 3:
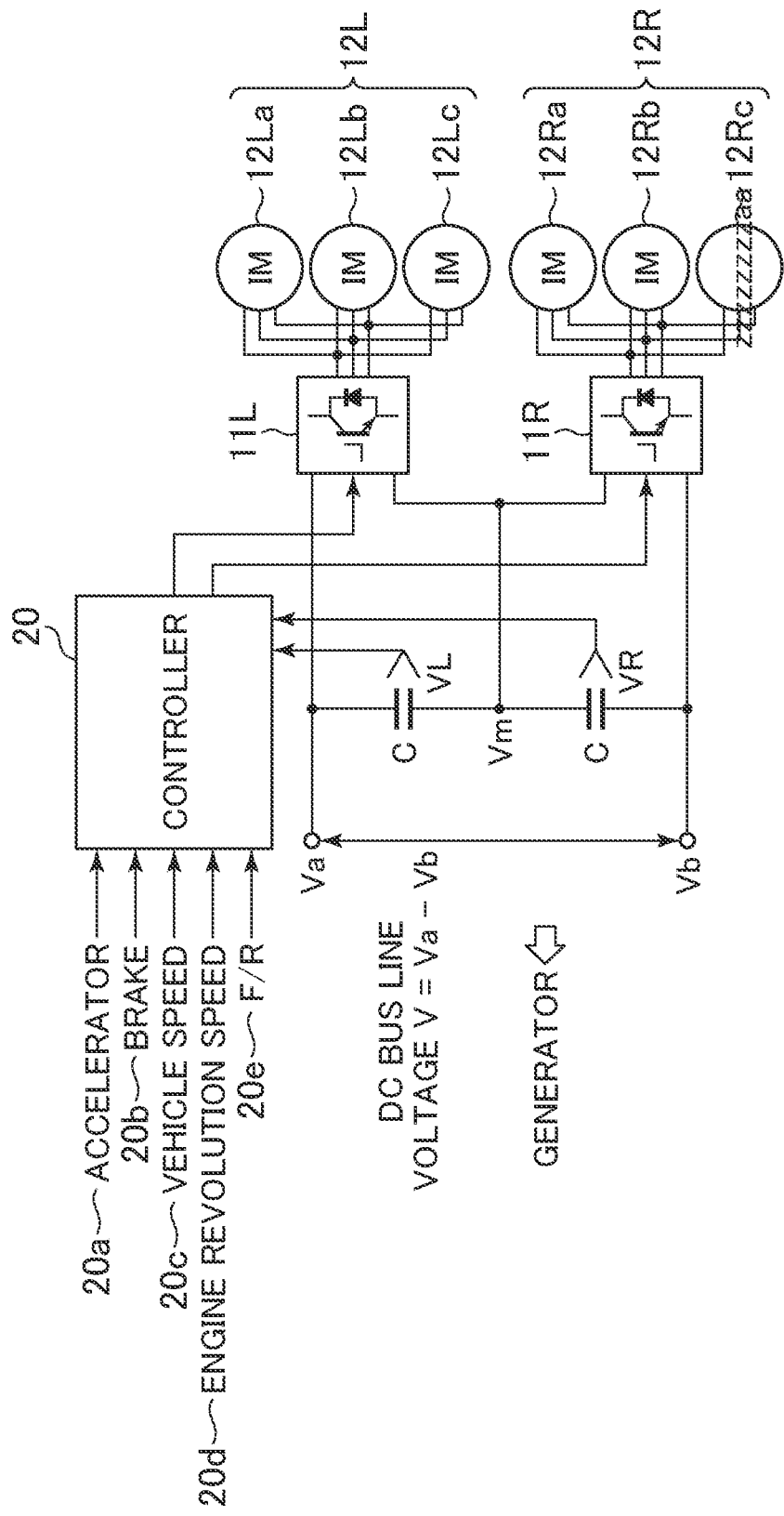
FIG. 3 is a figure schematically illustrating an electric power supply circuit of a traveling electric motor along with a control system.
Figure 4:
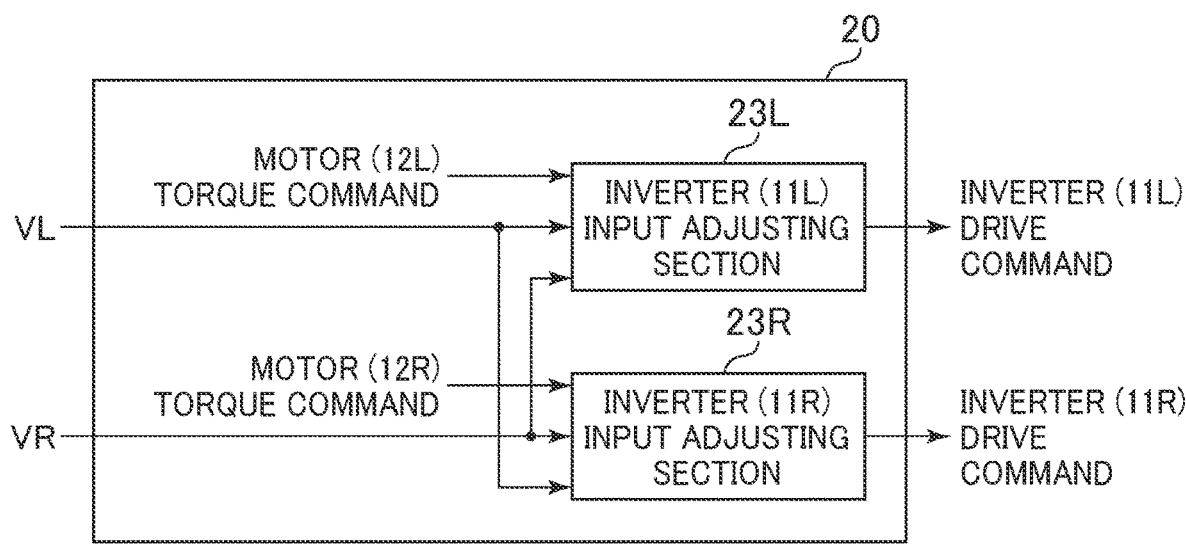
FIG. 4 is a functional block diagram illustrating a control function related to inverters of the control system.
Figure 5:
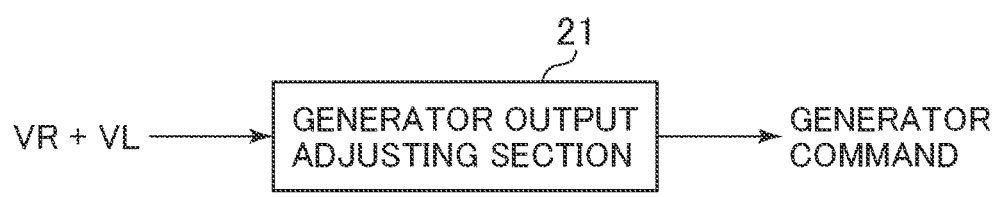
FIG. 5 is a functional block diagram illustrating a control function related to a generator.

FIG. 3 is a figure schematically illustrating an electric power supply circuit of a traveling electric motor along with a control system. In addition, FIG. 4 is a functional block diagram illustrating a control function related to the inverters of the control system, and FIG. 5 is a functional block diagram illustrating a control function related to the generator.

As illustrated in FIG. 3, electric power input portions of the inverters 11L and 11R that control the traveling electric motors 12L and 12R are connected between an intermediate electric potential Vm of a DC bus voltage V (=an electric potential Va–an electric potential Vb) supplied from the generator 10 through a DC bus line and the upper electric potential Va and between the intermediate electric potential Vm and the lower electric potential Vb, respectively. Here, the intermediate electric potential Vm is an electric potential between the upper electric potential Va and the lower electric potential Vb and can be deemed to be equal to (Va+Vb)/2, for example. That is, the inverters 11L and 11R are connected in series to each other in the DC bus line such that voltages obtained by halving a DC bus voltage which is an output of the generator 10 are applied to the inverters 11L and 11R, respectively.

At this time, a voltage corresponding to the electric potential difference between the upper electric potential Va and the intermediate electric potential Vm is applied to the electric power input portion of the inverter 11L, and this voltage appears as a voltage VL at a bypass capacitor C (also referred to as a smoothing capacitor) connected between the upper electric potential Va and the intermediate electric potential Vm. Similarly, a voltage corresponding to the electric potential difference between the intermediate electric potential Vm and the lower electric potential Vb is applied to the electric power input portion of the inverter 11R, and this voltage appears as a voltage VR at a bypass capacitor C connected between the intermediate electric potential Vm and the lower electric potential Vb.

The output portion of the inverter 11L is connected with the electric motors 12La, 12Lb, and 12Lc that are connected in parallel and constitute the traveling electric motor 12L, and an output (e.g., a three-phase drive signal) of the inverter 11L is connected to each of the parallel electric motors 12La, 12Lb, and 12Lc. Thereby, the electric motors 12La, 12Lb, and 12Lc of the traveling electric motor 12L simultaneously drive the driving wheel 3L on the basis of drive signals from the inverter 11L. In addition, the electric motors 12La, 12Lb, and 12Lc as seen from the inverter 11L need not be controlled individually, and the electric motors 12La, 12Lb, and 12Lc can be controlled collectively as one electric motor.

Similarly, the output portion of the inverter 11R is connected with the electric motors 12Ra, 12Rb, and 12Rc that are connected in parallel and constitute the traveling electric motor 12R, and each of branched phases of an output (e.g., a three-phase drive signal) of the inverter 11R is connected to each of the parallel electric motors 12Ra, 12Rb, and 12Rc. Thereby, the electric motors 12Ra, 12Rb, and 12Rc of the traveling electric motor 12R simultaneously drive the driving wheel 3R based on drive signals from the inverter 11R. In addition, the electric motors 12Ra, 12Rb, and 12Rc as seen from the inverter 11R need not be controlled individually, and the electric motors 12Ra, 12Rb, and 12Rc can be controlled collectively as one electric motor.

Note that although, in the present embodiment illustrated, as an example, the inverter 11L that drives the traveling electric motor 12L related to the driving wheel 3L on the left side of the vehicle body frame 7 is connected to the upper electric potential-side, and the inverter 11R that drives the traveling electric motor 12R related to the driving wheel 3R on the right side of the vehicle body frame 7 is connected to the lower electric potential-side, the inverter 11R that drives the traveling electric motor 12R may be connected to the upper electric potential-side. In addition, although, in the illustrated and explained example, induction motors are used as the electric motors 12La, 12Lb, 12Lc, 12Ra, 12Rb, and 12Rc, this is not the sole example, and magnetic motors may be used in another possible configuration, for example.

The control system 20 generates a command signal to the inverters 11L and 11R based on an accelerator signal 20a, a brake signal 20b, an F/R signal 20e, a vehicle speed signal 20c, an engine revolution speed 20d, voltages VL and VR, and the like that are output on the basis of operation of an accelerator pedal, a brake pedal, and a shift lever for switching between forward movement/backward movement of the dump truck 100 that are unillustrated, but are provided in the operator's seat 6. The inverters 11L and 11R convert, into alternating current power drive signals, direct current power input through an electric power input portion on the basis of command signals each input through the control system 20, and drive the traveling electric motors 12L and 12R.

As illustrated in FIG. 4, the control system 20 has: an inverter input adjusting unit 23L that generates an inverter drive command which is a command signal for driving the inverter 11L on the basis of a motor torque command which is a required torque of the traveling electric motor 12L; and the voltages VL and VR applied to the electric power input portions of the inverters 11L and 11R, respectively; and an inverter input adjusting unit 23R that generates an inverter drive command which is a command signal for driving the inverter 11R on the basis of a motor torque command which is a required torque of the traveling electric motor 12R; and the voltages VL and VR applied to the electric power input portions of the inverters 11L and 11R, respectively. The control system 20 has a function of generating motor torque commands for the traveling electric motors 12L and 12R on the basis of the accelerator signal 20a, the brake signal 20b, the F/R signal 20e, the vehicle speed signal 20c, the engine revolution speed 20d, and the like.

The inverter input adjusting units 23L and 23R each adjust the inverter command to the corresponding one of the inverters 11L and 11R according to a required torque (i.e., a motor torque command) to thereby adjust the output torque of the corresponding one of the traveling electric motors 12L and 12R, and simultaneously adjust the inverter command to the corresponding one of the inverters 11L and 11R such that the difference between the voltages VL and VR does not become equal to or larger than a predetermined value. Performing such load control suppresses increases of the difference between the voltages VL and VR resulting from the output difference between the left and right driving wheels 3L and 3R of the dump truck 100, that is, the voltage difference between voltages applied to the electric power input portions of the inverters 11L and 11R.

As illustrated in FIG. 5, a generator output adjusting unit 21 has a control function related to the generator 10, and generates a generator 10 command which is a command about an output of the generator 10 on the basis of the DC bus voltage V (=VL+VR) applied to the electric power input portions of the inverters 11L and 11R. Thereby, the generator output adjusting unit 21 performs control such that the DC bus voltage V becomes a predetermined voltage.

Note that although, in the example illustrated and explained in the present embodiment, the generator output adjusting unit 21 is provided separately from the control system 20, the control function of the generator output adjusting unit 21 may be configured to be realized in the control system 20. In addition, the configuration of the generator output adjusting unit 21 becomes unnecessary if a configuration in which the traveling electric motors 12L and 12R are driven with electric power supplied from the outside of the dump truck 100 (e.g., a trolley-like configuration) is used.

Figure 6:
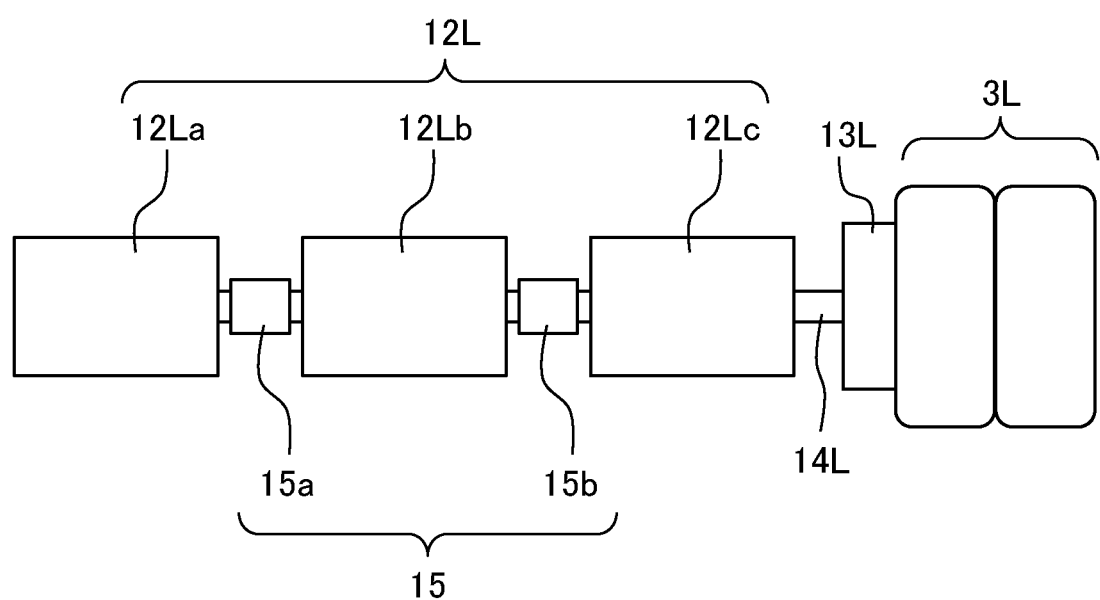
FIG. 6 is a figure illustrating an exemplary arrangement of an electric motor constituting the traveling electric motor.

FIG. 6 is a figure illustrating an exemplary arrangement of an electric motor constituting the traveling electric motor. FIG. 6 illustrates the traveling electric motor 12L extracted from the traveling electric motors 12L and 12R, and an illustration and explanation of the traveling electric motor 12R having a similar configuration are omitted.

As illustrated in FIG. 6, the traveling electric motor 12L is configured by coupling the output shafts 14L of the electric motors 12La, 12Lb, and 12Lc to each other coaxially by using couplings 15 (15a and 15b) having splines. The output shafts 14L of the electric motors 12La, 12Lb, and 12Lc are relatively fixed in the direction around the axis by using the couplings 15 and also are detachable from each other by being slidable in the axial direction. That is, the electric motors 12La, 12Lb, and 12Lc of the traveling electric motor 12L are connected in series to the driving wheel 3L, and the output shafts 14L of the electric motors 12La, 12Lb, and 12Lc are coupled to each other detachably via the couplings 15. The traveling electric motor 12R also has a similar configuration to that of the traveling electric motor 12L. Note that, although not illustrated, splines similar to those of the couplings 15 are provided to a connecting portion between an output shaft 14L and the speed reducer 13L, and the output shaft 14L is made detachable from the speed reducer 13L. In addition, in FIG. 6, the output shaft 14L is representatively illustrated as the output shafts of the electric motors 12La, 12Lb, and 12Lc.

Actions and effects of the thus-configured present embodiment are explained in detail by using a comparative example.

As dump trucks intended for uses at mines, vehicles having beds with various sizes are selected such as those in the classes of load of 100-ton to 300-ton, for example, depending on situations of work sites or the sizes of shovels for performing loading. That is, several series of dump trucks with different loads needs to be made ready as dump trucks intended for uses at mines. Accordingly, traveling electric motors with various capacities also need to be prepared as components of the driving systems.

Figure 7:
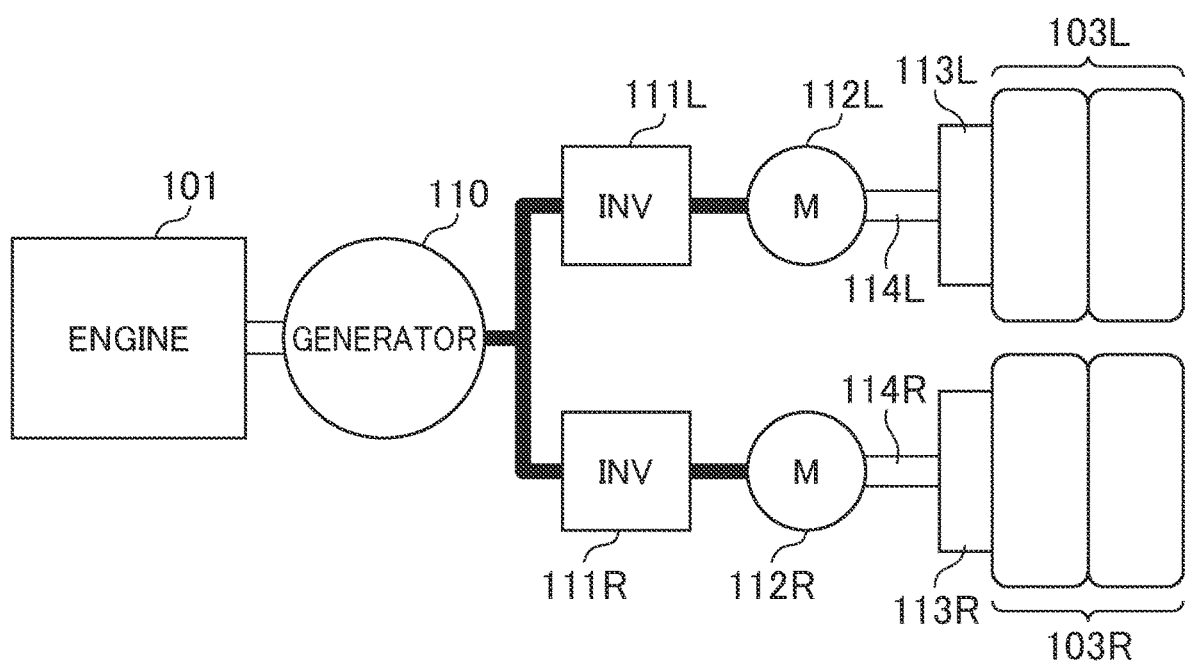
FIG. 7 is a figure schematically illustrating an extracted part of an electric driving system of a dump truck illustrated as a comparative example along with peripheral configurations.

FIG. 7 is a figure schematically illustrating an extracted part of an electric driving system of a dump truck illustrated as a comparative example along with peripheral configurations.

In FIG. 7, the electric driving system in the comparative example has: a generator 110 driven by an engine 101; traveling electric motors 112L and 112R that drive driving wheels 103L and 103R (wheels) by using electric power output from the generator 110; and inverters 111L and 111R that convert direct current power supplied from the generator 110 into alternating current power drive signals and supply the alternating current power drive signals to the traveling electric motors 112L and 112R. The driving wheels 103L and 103R are individually connected with output shafts 114L and 114R of the traveling electric motors 112L and 112R via speed reducers 113L and 113R, respectively and drive the driving wheels 103L and 103R by using the traveling electric motors 112L and 112R, respectively.

The dump truck in the comparative example like the one illustrated in FIG. 7 is allowed to travel by rotationally driving the left and right driving wheels 103L and 103R by using a pair of the traveling electric motors 112L and 112R. However, since in the case of a dump truck intended for uses at mines, the necessity arises for preparation of electric motors mounted on left and right rear wheels with different capacities for vehicles with different loads, there has been room for improvement in terms of initial cost reduction.

In contrast to this, in the present embodiment, the dump truck 100 including: the engine 1; the generator 10 driven by the engine 1; and a pair of the driving wheels 3L and 3R arranged to the left and right of the vehicle body frame 7 is configured to include: the traveling electric motor 12L including the plurality of electric motors 12La, 12Lb, and 12Lc that are coupled to the driving wheel 3L, and simultaneously drive the driving wheel 3L; and the traveling electric motor 12R including the plurality of electric motors 12Ra, 12Rb, and 12Rc that are coupled to the driving wheel 3R and simultaneously drive the driving wheel 3R.

That is, since driving of the left and right driving wheels each of which has been covered by output power of one electric motor as illustrated in the comparative example is configured to be covered by output power of the plurality of electric motors in the present embodiment, it becomes possible to easily change output power by changing the number of electric motors to be mounted on the left and right driving wheels according to the load of a dump truck. In other words, since it becomes unnecessary to prepare electric motors with different capacities for different loads of dump trucks, drive systems can be configured with identical components (here, electric motors), and it is possible to attempt to use identical electric motors for dump trucks with different loads. In addition, thereby, the availability of electric motors can be enhanced, and it becomes easier to perform replacement or repair at the time of maintenance.

In addition, since in this configuration, driving of the driving wheels is configured to be covered by output power of the plurality of electric motors, the capacity per electric motor can be reduced to the total capacity of the traveling electric motors (the electric motor group) divided by the number of the electric motors mounted. Typically, the lower the capacity of an electric motor is, the lower its withstanding voltage specification is. That is, since in the present embodiment, voltage motors with lower withstanding voltage specifications can be used, it becomes possible to further enhance the availability of traveling motors.

Furthermore, since by using electric motors with lower withstanding voltage specifications, inverters with lower voltage specifications can be used as inverters to drive the electric motors, the availability of components (i.e., inverters) to constitute a drive system can be further enhanced.

In addition, since in this configuration in the present embodiment, the electric power input portions of the inverters are connected in series to the DC bus line supplied with direct current power from the generator, and inverters for lower voltage uses can be used without using a step-down function in a DC bus line used for inverters with high voltage specifications, the present invention can be applied easily to a dump truck like the one in the comparative example in which each driving wheel is driven by a single electric motor.

In addition, there is a space where differential gears between left and right driving wheels and drive shafts that are connected via the differential gears are arranged in a conventional mechanically driven dump truck, and, as components of the electric driving system in the present embodiment to replace the above-mentioned configurations, a space in the electric driving system corresponding to the above-mentioned space is configured to have therein the plurality of electric motors having coaxially arranged and coupled output shafts; therefore, the present invention can be applied easily to the conventional mechanically driven dump truck.

Note that although, in the example illustrated and explained in the present embodiment, the plurality of electric motors having coaxially arranged and coupled output shafts are arranged, this is not the sole example, and an implementation method can be changed as appropriate for example: by joining the output shafts of electric motors to one speed reducer or in other manners depending on conditions of the structure of the speed reducer, the space where the electric motors or the like are arranged, or other factors.

In addition, although, in the example illustrated and explained in the present embodiment, a traveling electric motor is constituted by three electric motors, this is not the sole example, and the number of electric motors is changed selectively depending on the specifications (e.g., load etc.) of a dump truck.

Second Embodiment

A second embodiment of the present invention is explained with reference to FIG. 8. Only differences from the first embodiment are explained in the present embodiment, members similar to those in the first embodiment are given the same signs in the figures, and explanations thereof are omitted.

In the present embodiment, a voltage levelling device for performing adjustment of the voltages VL and VR applied to the electric power input portions of the inverters 11L and 11R is provided in the DC bus line of the first embodiment.

Figure 8:
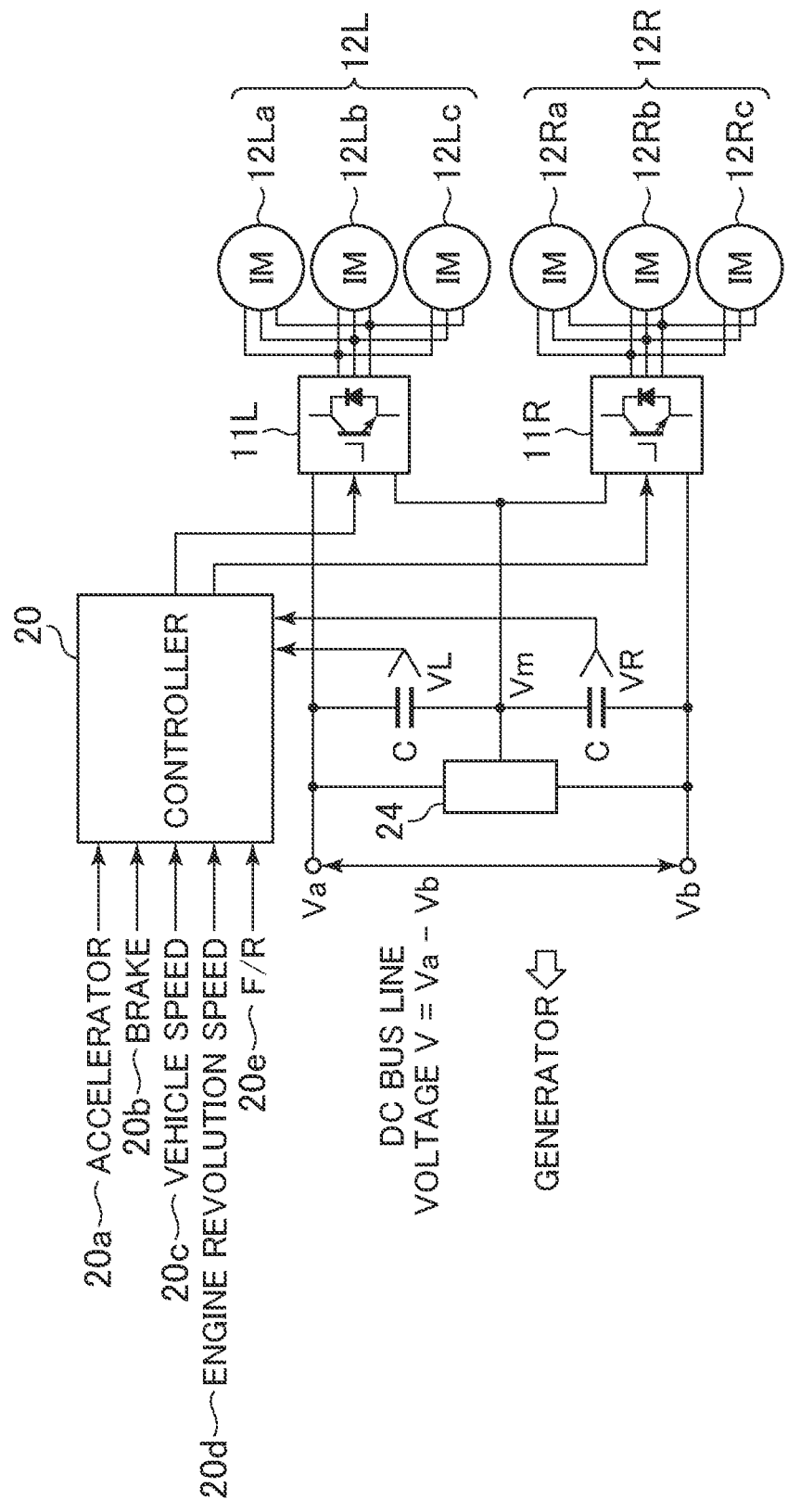
FIG. 8 is a figure schematically illustrating the electric power supply circuit of the traveling electric motor in a second embodiment along with the control system.

FIG. 8 is a figure schematically illustrating the electric power supply circuit of the traveling electric motor in the present embodiment along with the control system.

As illustrated in FIG. 8, the electric power input portions of the inverters 11L and 11R that control the traveling electric motors 12L and 12R are connected between the intermediate electric potential Vm of the DC bus voltage V (=the electric potential Va−the electric potential Vb) supplied from the generator 10 through the DC bus line and the upper electric potential Va and between the intermediate electric potential Vm and the lower electric potential Vb, respectively. Here, the intermediate electric potential Vm is an electric potential between the upper electric potential Va and the lower electric potential Vb and can be deemed to be equal to (Va+Vb)/2, for example. That is, the inverters 11L and 11R are connected in series in the DC bus line such that voltages obtained by halving a DC bus voltage which is an output of the generator 10 are applied to the inverters 11L and 11R.

At this time, a voltage corresponding to the electric potential difference between the upper electric potential Va and the intermediate electric potential Vm is applied to the electric power input portion of the inverter 11L, and this voltage appears as the voltage VL at the bypass capacitor C (also referred to as a smoothing capacitor) connected between the upper electric potential Va and the intermediate electric potential Vm. Similarly, a voltage corresponding to the electric potential difference between the intermediate electric potential Vm and the lower electric potential Vb is applied to the electric power input portion of the inverter 11R, and this voltage appears as the voltage VR at the bypass capacitor C connected between the intermediate electric potential Vm and the lower electric potential Vb.

The DC bus line is provided with a voltage levelling device 24 connected to the upper electric potential Va, lower electric potential Vb, and intermediate electric potential Vm of the DC bus voltage. The voltage levelling device 24 performs charging-discharging control such that the voltage difference between the voltage VL (=Va−Vm) and the voltage VR (=Vm−Va) is always kept at or smaller than a predetermined tolerated voltage difference. Thereby, the voltage applied to the electric power input portions of the inverters 11L and 11R to drive the traveling electric motors 12L and 12R of the left and right driving wheels 3L and 3R is controlled to stay at the magnitude which is half the DC bus voltage V (i.e., the voltage V/2).

Configurations in the other respects are similar to those in the first embodiment.

Also in the thus-configured present embodiment, effects similar to those in the first embodiment can be attained.

In addition, for example, there are possible cases where there is a difference in output power between left and right driving wheels if a dump truck performs a cornering operation at a relatively high speed. In such a case, the difference between the voltages VL and VR applied to the electric power input portions of the inverters 11L and 11R increases abruptly, and it might be difficult to adjust the voltages VL and VR such that their voltage difference is kept at or smaller than a predetermined tolerated voltage difference with adjustment of outputs of the inverters 11L and 11R by using the inverter input adjusting units 23L and 23R in the first embodiment alone.

In contrast to this, since in the present embodiment, the voltage levelling device 24 connected between the upper electric potential Va, lower electric potential Vb, and intermediate electric potential Vm of the DC bus voltage is provided and is configured to perform charging-discharging control such that the voltage difference between the voltage VL and the voltage VR is always kept at or smaller than the predetermined tolerated voltage difference, voltages applied to the electric power input portions of the inverters 11L and 11R can be stabilized more.

Next, features of each embodiment explained above are explained.

(1) In the embodiments explained above, an electrically driven work vehicle (e.g., the dump truck 100) includes: an engine 1; a generator 10 driven by the engine; and a pair of wheels (e.g., the driving wheels 3L and 3R) including a first wheel and a second wheel arranged to the left and the right of a vehicle body frame, in which the electrically driven work vehicle includes: a first electric motor group (e.g., the traveling electric motor 12L) including the plurality of electric motors 12La, 12Lb, and 12Lc that are coupled to the first wheel (e.g., the driving wheel 3L) and simultaneously drive the first wheel; a second electric motor group (e.g., the traveling electric motor 12R) including the plurality of electric motors 12Ra, 12Rb, and 12Rc that are coupled to the second wheel (e.g., the driving wheel 3R) and simultaneously drive the second wheel; a first inverter (e.g., the inverter 11L) that drives the plurality of electric motors in the first electric motor group; and a second inverter (e.g., the inverter 11R) that drives the plurality of electric motors in the second electric motor group, the pluralities of electric motors in the first and second electric motor groups have the same rated output power, the plurality of electric motors in the first electric motor group are connected to the first inverter in parallel, and the plurality of electric motors in the second electric motor group are connected to the second inverter in parallel, and the first and second inverters are connected in series to each other such that voltages obtained by halving a DC bus voltage that is an output voltage of the generator are applied to the first and second inverters, respectively.

Thereby, drive systems corresponding to loads of dump trucks or the like can be configured using identical components. In addition, an inverter for lower voltage uses can be used without using a step-down function for a DC bus line used for an inverter with high voltage specifications.

(2) In addition, in the embodiments explained above, in the electrically driven work vehicle according to (1), the pluralities of electric motors in the first and second electric motor groups are each an induction motor.

(3) In addition, in the embodiments explained above, in the electrically driven work vehicle according to (1), the pluralities of electric motors in the first and second electric motor groups are each a magnetic motor.

(4) In addition, in the embodiments explained above, in the electrically driven work vehicle according to (1), the plurality of electric motors in the first electric motor group, and the plurality of electric motors in the second electric motor group are connected in series to the first and second wheels, respectively, output shafts 14L of the plurality of electric motors in the first electric motor group are coupled detachably and coaxially with each other via a coupling, output shafts 14R of the plurality of electric motors in the second electric motor group are coupled detachably and coaxially with each other via a coupling, and the numbers of the electric motors in the first and second electric motor groups are each changeable.

(5) In addition, in the embodiments explained above, a wheel electric driving unit includes: a wheel (e.g., the driving wheel 3L); and a plurality of electric motors 12La, 12Lb, and 12Lc that are coupled in series to the wheel, and have the same rated output power.

(6) In addition, in the embodiments explained above, the wheel electric driving unit according to (5) further includes a plurality of couplings 15 that couple output shafts 14L of the plurality of electric motors to each other detachably, in which the number of the plurality of electric motors that drive the wheel is changeable.

<Additional Notes>

Note that the present invention is not limited by the embodiments explained above, but includes various modifications and combinations within a scope not deviating from the gist of the present invention. In addition, the present invention is not limited to those including all the configurations explained about the embodiments explained above, but includes those from which some of the configurations are remove. In addition, each configuration, function or the like explained above may be partially or entirely realized by designing it in an integrated circuit or by other means, for example. In addition, each configuration, function or the like explained above may be realized by software by a processor interpreting and executing a program to realize each function.

For example, although, in the configuration of the present embodiment, electric power input portions of inverters are connected in series with a DC bus line supplied with direct current power from a generator, in a possible configuration, for example, a step-down function may be provided at the output of the generator or the DC bus line to lower DC bus voltage to V/2, and an electric power input portion of an inverter for lower voltage uses in the present invention may be connected to the DC bus line. In this case, electric power input portions of a plurality of inverters that are connected in parallel can also be connected to the DC bus line.

DESCRIPTION OF REFERENCE CHARACTERS

1: Engine
2: Electric driving system
3L: Driving wheel
3R: Driving wheel
4L: Follower wheel
4R: Follower wheel
5: Bed (vessel)
5a: Pin-joining portion
6: Operator's seat
7: Vehicle body frame
10: Generator
11L, 11R: Inverter
12L, 12R: Traveling electric motor
12La, 12Lb, 12Lc, 12Ra, 12Rb, 12Rc: Electric motor
13L, 13R: Speed reducer
14L, 14R: Output shaft
15, 15a, 15b: Coupling
20: Control system
20a: Accelerator signal
20b: Brake signal
20c: Vehicle speed signal
20e: Signal
21: Generator output adjusting unit
23L, 23R: Inverter input adjusting unit
24: Voltage levelling device
100: Dump truck
101: Engine
103L, 103R: Driving wheel
110: Generator
111L, 111R: Inverter
112L, 112R: Traveling electric motor
113L, 113R: Speed reducer
114L, 114R: Output shaft

The invention claimed is:

1. An electrically driven work vehicle including an engine, a generator driven by the engine, and a pair of wheels including a first wheel and a second wheel arranged to a left and a right of a vehicle body frame, the electrically driven work vehicle comprising:
a first electric motor group including a plurality of electric motors that are coupled to the first wheel and simultaneously drive the first wheel;
a second electric motor group including a plurality of electric motors that are coupled to the second wheel and simultaneously drive the second wheel;
a first inverter that drives the plurality of electric motors in the first electric motor group; and
a second inverter that drives the plurality of electric motors in the second electric motor group, wherein
the pluralities of electric motors in the first and second electric motor groups have a same rated output power, the plurality of electric motors in the first electric motor group are connected to the first inverter in parallel, and the plurality of electric motors in the second electric motor group are connected to the second inverter in parallel, and
the first and second inverters are connected in series to each other such that voltages obtained by halving a direct current bus voltage that is an output voltage of the generator are applied to the first and second inverters, respectively.

2. The electrically driven work vehicle according to claim 1, wherein
the pluralities of electric motors in the first and second electric motor groups are each an induction motor.

3. The electrically driven work vehicle according to claim 1, wherein
the pluralities of electric motors in the first and second electric motor groups are each a magnetic motor.

4. The electrically driven work vehicle according to claim 1, wherein
the plurality of electric motors in the first electric motor group and the plurality of electric motors in the second electric motor group are connected in series to the first and second wheels, respectively, and
output shafts of the plurality of electric motors in the first electric motor group are coupled detachably and coaxially with each other via a coupling, output shafts of the plurality of electric motors in the second electric motor group are coupled detachably and coaxially with each other via a coupling, and the numbers of the electric motors in the first and second electric motor groups are each changeable.

* * * * *